United States Patent

Hulteen et al.

(10) Patent No.: US 10,823,313 B2
(45) Date of Patent: Nov. 3, 2020

(54) SMOKE AND SOUND BARRIER FOR A BUILDING PENETRATION

(71) Applicant: 3M INNOVATIVE PROPERTIES COMPANY, St. Paul, MN (US)

(72) Inventors: John C. Hulteen, Afton, MN (US); George W. Frost, Afton, MN (US); Richard J. Haffner, New Richmond, WI (US); Ernst L. Schmidt, Hager City, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 409 days.

(21) Appl. No.: 15/564,770

(22) PCT Filed: Mar. 25, 2016

(86) PCT No.: PCT/US2016/024137
§ 371 (c)(1),
(2) Date: Oct. 6, 2017

(87) PCT Pub. No.: WO2016/167938
PCT Pub. Date: Oct. 20, 2016

(65) Prior Publication Data
US 2018/0106395 A1  Apr. 19, 2018

Related U.S. Application Data

(60) Provisional application No. 62/149,081, filed on Apr. 17, 2015.

(51) Int. Cl.
*F16L 5/04* (2006.01)
*F16J 15/06* (2006.01)
(Continued)

(52) U.S. Cl.
CPC .............. *F16L 5/10* (2013.01); *F16J 15/064* (2013.01); *F16L 55/0336* (2013.01);
(Continued)

(58) Field of Classification Search
CPC ....... F16L 5/02; F16L 5/04; F16L 5/10; F16L 5/00; F16L 5/14; F16L 55/033;
(Continued)

(56) References Cited

U.S. PATENT DOCUMENTS 3,729,879 A * 5/1973 Franklin ................. E04B 1/767
                                                  52/406.2
4,249,353 A * 2/1981 Berry ....................... H02G 3/22
                                                    52/232
(Continued)

FOREIGN PATENT DOCUMENTS

DE      200 17 115     4/2002
DE      10223688      12/2003
(Continued)

OTHER PUBLICATIONS

International Search Report for PCT International Application No. PCT/US2016/024137, dated Jul. 4, 2016, 3 pages.

*Primary Examiner* — Edgardo San Martin
(74) *Attorney, Agent, or Firm* — Julie Lapos-Kuchar

(57) ABSTRACT

Described herein is a smoke and sound barrier for construction assemblies comprising a penetration wherein, optionally a packing material, and a non-porous adhesive article are used.

20 Claims, 2 Drawing Sheets

(51) Int. Cl.
  *E04B 1/94* (2006.01)
  *F16L 5/10* (2006.01)
  *H02G 3/22* (2006.01)
  *F16L 55/033* (2006.01)
  *G10K 11/162* (2006.01)
  *H02G 3/04* (2006.01)

(52) U.S. Cl.
  CPC ............ *G10K 11/162* (2013.01); *H02G 3/22* (2013.01); *H02G 3/0412* (2013.01)

(58) Field of Classification Search
  CPC ..... F16L 55/0336; F16J 15/064; F16J 15/065; F16J 15/06; E04B 1/92; E04B 1/94; E04B 1/946; E04B 1/948; E04B 1/88; H02G 3/22; H02G 3/24; H02G 3/0412
  See application file for complete search history.

(56) References Cited

U.S. PATENT DOCUMENTS

| | | | |
|---|---|---|---|
| 4,329,384 A | 5/1982 | Vesley | |
| 4,330,590 A | 5/1982 | Vesley | |
| 4,363,199 A * | 12/1982 | Kucheria | F16L 5/02 52/220.8 |
| 4,704,840 A * | 11/1987 | Gatto | F16L 5/02 249/83 |
| 4,709,523 A * | 12/1987 | Broderick | E04B 1/767 428/124 |
| 4,796,401 A * | 1/1989 | Wexler | A62C 2/065 52/1 |
| 4,811,529 A * | 3/1989 | Harris | E04B 1/6813 277/640 |
| 4,901,488 A | 2/1990 | Murota | |
| 5,155,957 A * | 10/1992 | Robertson | A62C 2/065 137/360 |
| 5,174,077 A * | 12/1992 | Murota | F16L 5/04 52/220.8 |
| 5,326,609 A * | 7/1994 | Gohlke | B32B 15/04 428/76 |
| 5,374,477 A | 12/1994 | Lawless et al. | |
| 5,548,934 A | 8/1996 | Israelson | |
| 5,593,771 A * | 1/1997 | Lawless | C09J 7/026 156/157 |
| 5,953,872 A * | 9/1999 | MacMillian | F16L 5/04 52/220.8 |
| 5,974,750 A | 11/1999 | Landin | |
| 6,441,092 B1 | 8/2002 | Gieselman | |
| 6,491,468 B1 * | 12/2002 | Hagen | E04B 1/6803 277/316 |
| 6,530,187 B2 * | 3/2003 | Shimizu | F16L 5/02 52/220.1 |
| 6,536,169 B2 | 3/2003 | Dykhoff | |
| 7,082,730 B2 | 8/2006 | Monden | |
| 7,568,314 B2 * | 8/2009 | Collins | H02G 3/22 52/219 |
| 8,393,121 B2 * | 3/2013 | Beele | F16L 5/04 169/45 |
| 8,490,338 B2 | 7/2013 | Longo | |
| 8,590,272 B2 | 11/2013 | Thomas | |
| 8,636,076 B2 * | 1/2014 | Cordts | A62C 2/06 169/45 |
| 8,783,693 B2 * | 7/2014 | Beele | H02G 3/22 277/314 |
| 9,562,174 B2 | 2/2017 | Russell | |
| 9,616,259 B2 * | 4/2017 | Pilz | E04B 1/948 |
| 10,422,447 B2 * | 9/2019 | Muenzenberger | F16L 5/02 |
| 10,563,396 B2 * | 2/2020 | Foerg | E04B 1/948 |
| 2004/0137185 A1 | 7/2004 | Sieber et al. | |
| 2005/0034389 A1 | 2/2005 | Boot | |
| 2007/0169963 A1 | 7/2007 | Beele | |
| 2011/0113709 A1 | 5/2011 | Pilz | |
| 2011/0302860 A1 | 12/2011 | Cordts | |
| 2012/0085063 A1 | 4/2012 | Pufahl | |
| 2012/0097405 A1 | 4/2012 | Cordts | |
| 2014/0008086 A1 | 1/2014 | Foerg | |
| 2014/0127443 A1 | 5/2014 | Zhou | |
| 2015/0267016 A1 | 9/2015 | Humiston | |
| 2018/0345059 A1* | 12/2018 | Hulteen | A62C 2/065 |
| 2019/0145094 A1* | 5/2019 | Foerg | E04B 1/948 |

FOREIGN PATENT DOCUMENTS

| | | |
|---|---|---|
| DE | 69818634 | 9/2004 |
| DE | 10 2008 059564 | 6/2010 |
| EP | 0039587 | 11/1981 |
| EP | 0161557 | 7/1989 |
| EP | 1 422 459 | 5/2004 |
| GB | 2212187 | 7/1989 |
| GB | 2472402 | 2/2011 |
| GB | 2522934 | 8/2015 |
| JP | H07-049178 | 11/1995 |
| JP | H08-216316 | 8/1996 |
| JP | H10-185009 | 7/1998 |
| JP | 2009-192075 | 8/2009 |
| JP | 2011-052448 | 3/2011 |
| WO | WO 94/20055 | 9/1994 |
| WO | WO 96/26332 | 8/1996 |
| WO | 2003-038206 | 5/2003 |
| WO | 2016-167937 | 10/2016 |
| WO | WO 2016/167956 | 10/2016 |
| WO | WO 2016/168169 | 10/2016 |

\* cited by examiner

SMOKE AND SOUND BARRIER FOR A BUILDING PENETRATION

CROSS REFERENCE TO RELATED APPLICATIONS

This application is a national stage filing under 35 U.S.C. 371 of PCT/US2016/024137, filed Mar. 25, 2016, which claims the benefit of U.S. Application No. 62/149,081, filed Apr. 17, 2015, the disclosure of which is incorporated by reference in its/their entirety herein.

TECHNICAL FIELD

A smoke and sound barrier for a penetration in a construction assembly is described comprising an adhesive article and an optional packing material.

BACKGROUND

There is a growing emergence of building codes and design guidelines specifying a minimum Sound Transmission Class (STC) rating within a building. There are also guidelines in international building codes for smoke partitions and smoke barriers. Openings within building structures to allow for penetrating items (such as cables, pipes, ducts, conduits, etc.) through the building can act as conduits for the passage of sound and smoke within commercial structures (e.g., apartments, office buildings, schools, etc.). These openings need to be restored to reduce sound transmission and prevent smoke from passing through the openings into adjoining areas.

SUMMARY

There is a desire to identify alternative smoke and sound barriers for treating construction assemblies comprising penetrations, which may allow advantages in ease of use, range of use, and/or aesthetics.

In one aspect, the use of a non-porous adhesive article and optionally a packing material, on a construction assembly to provide a smoke and sound barrier system is described, wherein the non-porous adhesive article comprises a substrate and an adhesive disposed on a first major surface of the substrate;

wherein the construction assembly comprises a first major surface and an opposing second major surface and further comprises a first penetration which intersects the first major surface, the first major surface further comprises a first attachment area located about the perimeter of the penetration;

wherein the first penetration optionally comprises the packing material; and wherein the non-porous adhesive article is fixedly attached to the first attachment area.

In another aspect, a smoke and sound barrier system is described comprising a non-porous adhesive article comprising a substrate and an adhesive disposed on a first major surface of the substrate; optionally a packing material; and a construction assembly comprising a first major surface and an opposing second major surface and a first penetration which intersects the first major surface, the first major surface comprising a first attachment area located about the perimeter of the penetration;

wherein the first penetration optionally comprises the packing material; and wherein the non-porous adhesive article is fixedly attached to the first attachment area.

In yet another aspect, a method of making a smoke and sound barrier system is described comprising (a) providing a construction assembly comprising a first major surface and an opposing second major surface and further comprising a first penetration which intersects the first major surface, the first major surface further comprises a first attachment area located about the perimeter of the penetration, (b) optionally inserting a packing material into the first penetration; and then (c) sealing the first penetration by fixedly attaching a non-porous adhesive article to the first attachment area of the first major surface to form a smoke and sound barrier system The above summary is not intended to describe each embodiment. The details of one or more embodiments of the invention are also set forth in the description below. Other features, objects, and advantages will be apparent from the description and from the claims.

BRIEF DESCRIPTION OF THE DRAWINGS

Shown in FIG. 1A is a top view

Figure 2:
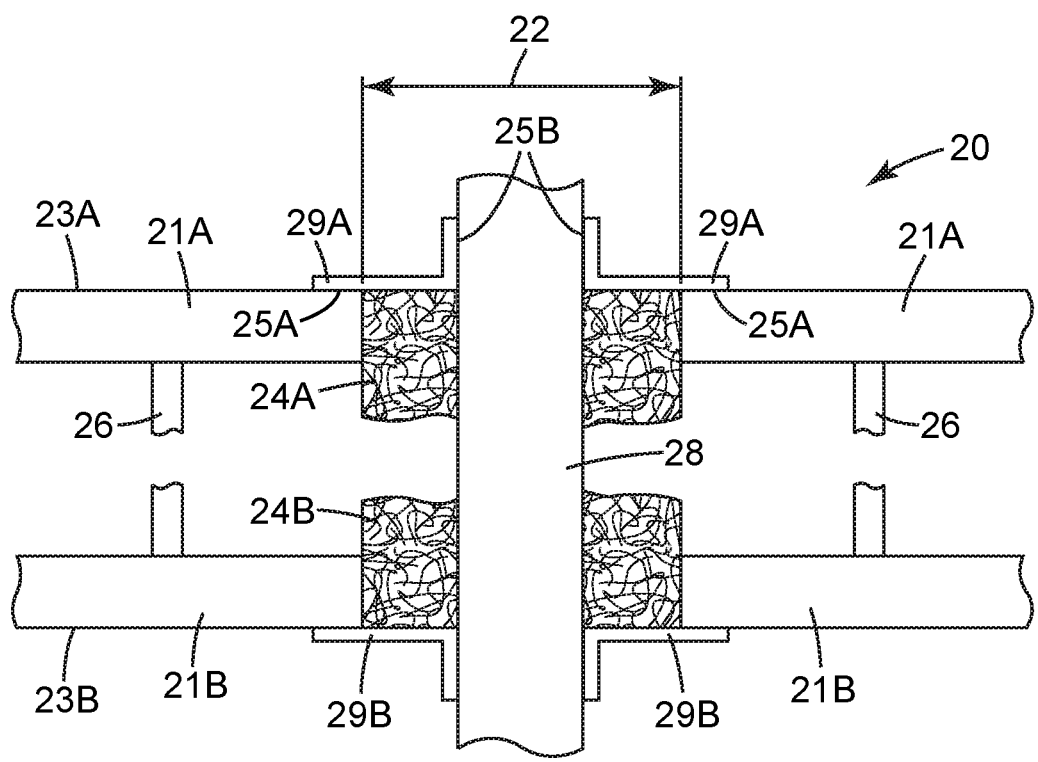

Shown in FIG. 2 is a side-view of a smoke and sound barrier system disclosed herein comprising a through penetration.

DETAILED DESCRIPTION

As used herein, the term

"construction assembly" refers to a building construction such wall or floor comprising two opposing major surfaces wherein each major surfaces comprises a structural element;

"penetration" refers to an opening (or hole) which intersects a major surface of a construction assembly to allow for access to the interior of the construction assembly or to enable the passage of penetrating objects through the construction assembly;

"penetrating object" refers to a physical item that passes through the penetration and extends beyond the surface of the construction assembly. Such penetrating objects include cables, conduits, ducts, pipes, etc.);

"membrane penetration" refers to a penetration located on only one major surface of the construction assembly;

"through penetration" refers to construction assembly having an through hole wherein there are penetrations on both opposing major surfaces of the construction assembly;

"blank" refers to a penetration in a construction assembly that does not have a penetrating object;

"a", "an", and "the" are used interchangeably and mean one or more; and

"and/or" is used to indicate one or both stated cases may occur, for example A and/or B includes, (A and B) and (A or B).

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

The present disclosure is directed toward the treatment of penetrations within construction assemblies to minimize sound transfer and prevent the spread of smoke. Surprisingly, it has been discovered that by sealing the penetration with a non-porous adhesive article, such as a tape, and optionally packing the opening with a packing material, can provide a smoke and sound barrier system. As used herein, a smoke and sound barrier means a construction that can prevent the passage of smoke and reduces the transmission of sound.

In one embodiment, the smoke and sound barrier system is rated, meaning that it passes an approved regiment of testing. Such tests include: ASTM method E90-04 "Standard Test method for Laboratory measurement of Airborne Sound Transmission Loss of Building Partitions and Elements; ASTM E413-10 "Classification for Rating Sound Insulation" and the UL (Underwriters Laboratory) standard 1479 (R2012) "Fire Tests of Through-Penetration Firestops" which includes an optional air leakage test. Other tests include ASTM E779-10 "Standard Test Method for Determining Air Leakage Rate by Fan Pressurization; ISO 9972: 2006 "Thermal performance of Buildings—Determination of Air Permeability of buildings—Fan Pressurization Method; EN 1366-3:2009 Fire Resistance Tests for Service Installations—Penetration Seals; AS 1530.4-2005 Methods of Fire Tests on Building Materials, Components and Structures Part 4: Fire Resistance Test of Elements of Construction; and ISO 10295-1:2007 Fire Tests for Building Elements and Components—Fire Testing of Service Installations—Part 1: Penetration Seals.

To pass an approved air leakage test (i.e., smoke test) the systems of the present disclosure need to withstand a defined temperature profile (for example, exceeding temperatures greater than 200° C.) for a period of time (as described in the standards). In general, for air leakage, the lower the value, the better the smoke resistance.

The smoke and sound barrier systems of the present disclosure comprises the construction assembly, penetration, penetrating object, if present, adhesive, and optional packing material. To achieve an approved sound transmission loss test, the systems of the present disclosure need to have a STC rating that meets or exceeds the applicable building code requirements or any architectural requirements to reduce sound transmission. In general, the higher the number for an STC rating, the better the sound reduction properties.

Preferably, the treatment of the penetration with the smoke and sound barrier should restore the construction assembly back to its original STC rating without the penetration. However, different building codes may require that the construction assembly be returned to a portion of the original STC rating. In one embodiment, the smoke and sound barrier of the present disclosure returns the construction assembly back to at least 50, 70, 80, 90, 95, or even 100% of its original STC rating.

In one embodiment, the smoke and sound barrier systems of the present disclosure pass a flexibility test, wherein the system is expanded and contracted for a given number of cycles. For example, in one embodiment, the system must pass the tests for movement as described in ASTM E1399/E1399M-97 (2013) "Standard Test Method for Cyclic Movement and Measuring the Minimum and Maximum Joint Widths of Architectural Joint Systems".

In one embodiment, the assemblies of the present disclosure pass ASTM E090-04, E413-10, and UL 1479.

In the present disclosure, the construction assembly can comprise a membrane penetration or a through penetration. As is known in the art and described in industry standard test methods, if the assembly has a symmetric through penetration only one side of the assembly is tested to determine the rating. However, if the assembly comprises a membrane penetration or an asymmetric through penetration, then each side (front and back) of the assembly is independently tested to ensure that the wall or floor is restored back it its original rating and/or meets the desired building requirements.

Figure 1A:
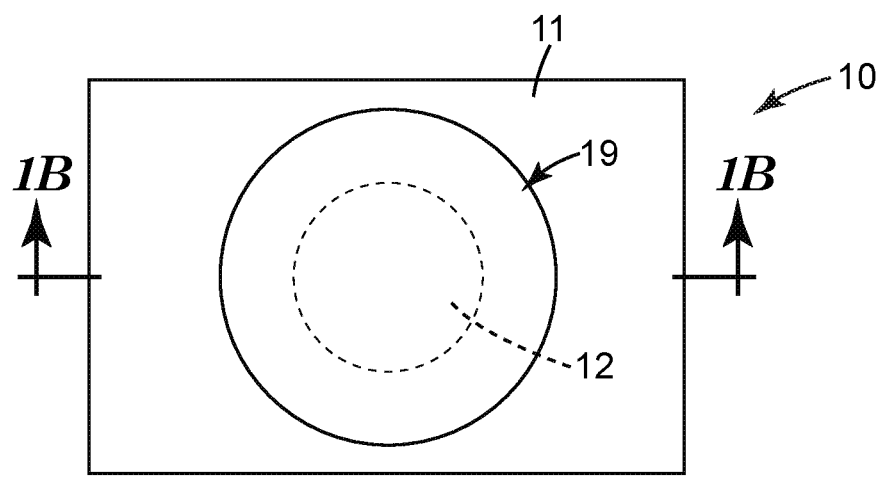
FIG. 1B is a side-view of one side of a smoke and sound barrier system disclosed herein.
Figure 1B:
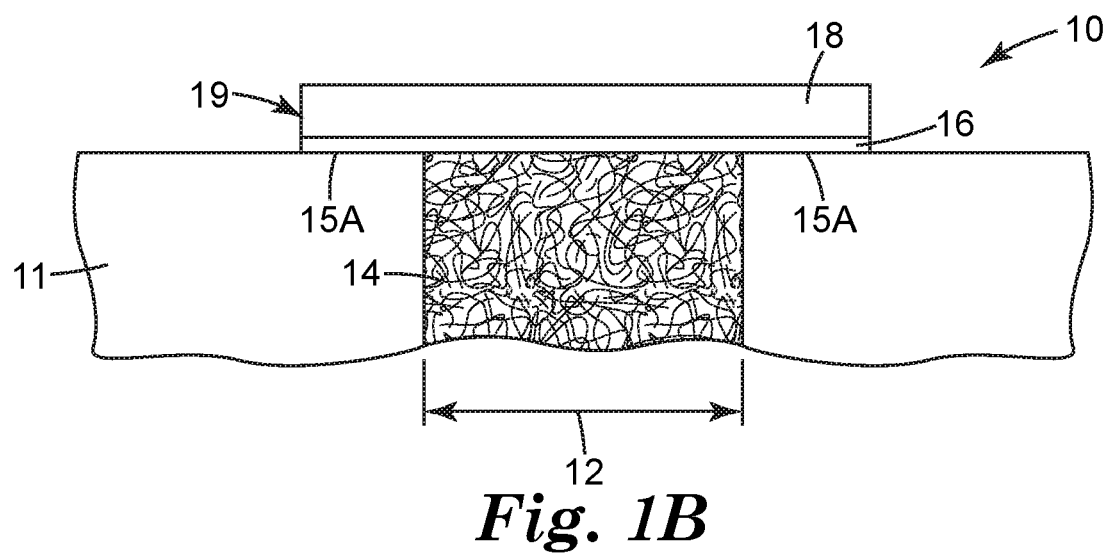

FIG. 1 depicts an exemplary configuration of a smoke and sound barrier system of the present disclosure, where FIG. 1A is a top view and FIG. 1B is a side view of a blank. System 10 is a smoke and sound barrier system comprising a construction assembly comprising structural element 11, which also comprises penetration 12 which extends through structural element 11. Penetration 12 is at least partially filled with packing material 14. Non-porous adhesive article 19 is applied over penetration 12, wherein the non-porous adhesive article is fixedly attached via adhesive 16 to first attachment area 15A of the structural element.

FIG. 2 depicts an exemplary configuration of a smoke and sound barrier system of the present disclosure. System 20 includes a construction assembly comprising structural elements 21A and 21B supported by stud 26 comprising through penetration 22. Through penetration 22 intersects first major surface 23A and opposing second major surface 23B. Penetrating object 28 passes through the construction assembly via penetration 22. Packing material 24A and 24B is placed into penetration 22 around penetrating object 28. First major surface 23A comprises a first attachment area 25A around the perimeter of the penetration. Penetrating object 28 comprises a second attachment area 25B around its perimeter near the intersection of the penetration with first major surface 23A. Adhesive article 29A is fixedly attached to first attachment area 25A and second attachment area 25B, sealing the first major surface of the construction assembly. Similarly, adhesive article 29B is fixedly attached to second major surface 23B and penetrating object 28, sealing the second major surface of the construction assembly.

Depicted in FIGS. 1 and 2 are penetrations occurring along the face of a planar surface of a construction assembly, which encompass a majority of the penetrations in the construction industry. However, in one embodiment, a penetration can occur at the meeting of two structural elements that may be at an angle relative to each other, such as penetration in a floor-to-wall or head-of-wall.

When the system comprises a penetrating object, in one embodiment, the adhesive article can withstand the differential movement of the penetrating object relative to the construction assembly in non-fire conditions due to, for example, expanding and contracting of the penetrating object and shifting of the penetrating object relative to the construction assembly.

It is an objective of the present disclosure that the system provides a smoke and sound barrier. In one embodiment, the system of the present disclosure passes a sound transmission reduction test such that the system meets the desired rating. It is also an objective in the present disclosure that in one embodiment, the adhesive article seals the opening and that the seal not be compromised during the shifting of the construction assembly and the penetrating object relative to one another thus, acting to prevent transmission of smoke during, e.g., a fire.

The penetrations disclosed herein occur in building constructions, thus, the non-porous adhesive article of the present disclosure is fixedly attached to structural elements made of construction materials such as gypsum wallboard (i.e., sheetrock), metal (e.g., steel, aluminum), cement (e.g., Portland cement concrete), concrete, mortar, masonry (e.g., brick and cement blocks), wood, plastics, and combinations thereof.

These penetrations can occur at various locations and numbers along a construction assembly. The shape (circular, oblong, rectangular, etc.) and width of the opening can vary. In one embodiment, the length of the smallest dimension of the opening is at least 0.125, 0.25, 0.5, 0.75, 0.825, 1, 2, 3, 4, or even 5 inch (3.1, 6.4, 12.7, 19, 21, 25, 51, 76, 102, or even 127 mm); and at most 16, 48, or even 60 inches (406, 1219, or even 1524 mm). Typically, in the larger opening dimensions a penetrating object is present and will consume a portion of the opening. Therefore, the amount of the penetration requiring sealing with the adhesive article will be a portion of the dimension of the penetration. For example, a wall comprising a 2 inch diameter circular opening with a 1.5 inch diameter pipe therethrough would require sealing of the opening in the wall around the perimeter of the pipe (about 0.25 inches around the outside of the pipe).

The penetrating objects can be made from a variety of materials commonly used in the construction industry including, for example, metal, glass, fiberglass, and plastic (including polyethylene, polypropylene, polyvinyl chloride, and fluorinated plastics such as polytetrafluoroethylene (PTFE)).

Optionally, in one embodiment of the present disclosure, a packing material is installed into the penetration. The packing material can include materials known in the art to reduce sound transmission such as synthetic and non-synthetic material including glass fiber, ceramic fiber, mineral fiber (also known as mineral wool, basalt, or rock wool), intumescent and endothermic packing materials, foams including open cell and closed cell foams such as backer rods, and combinations thereof. These materials may be used as fabrics, mats, bats, sheets, or loose fill.

Exemplary ceramic fibrous materials include ceramic oxide fibers such as small diameter melt-blown aluminosilicate ceramic fibers commercially available, for example, under the trade designations "FIBERFRAX DURABACK BLANKET" from Carborundum Co. of Niagara Falls, N.Y., and aluminosilicate fibers commercially available, for example, under the trade designations "CERAWOOL" and "KAOWOOLII" from Thermal Ceramics of Augusta, Ga.; and ceramic oxide fibers commercially available, for example, from the 3M Company under the trade designation "NEXTEL" (e.g., aluminosilicate ceramic oxide fibers, aluminoborosilicate ceramic oxide fibers commercially available under the trade designation "NEXTEL 312", and alumina ceramic oxide fibers commercially available under the trade designation "NEXTEL 610"). Exemplary mineral wool (such as, mineral wool derived from blast furnace slag having the major components silica, calcia, alumina, and magnesia) include those available, for example, under the trade designation "THERMOFIBER" from U.S. Gypsum of Chicago, Ill. Exemplary blends include, for example, a blend of mineral wool and glass fiber available under the trade designation "3M Fire Barrier Packing Material PM4" available from 3M Co., St. Paul, Minn.

In one embodiment the packing material is free of intumescent materials and/or from endothermic materials. In another embodiment, the packing material is constructed from intumescent materials or from endothermic materials. Intumescent materials are materials that when exposed to heat or flames, expand typically at exposure temperatures above about 200° C., and serve as a barrier to heat, smoke, and flames. Exemplary intumescent material include polymeric binders, fillers, and intumescent particles (e.g., silicates, expanding graphite, and vermiculite) such as those known in the art. Endothermic materials absorb heat and are used to shield construction components from the effects of high temperatures. Useful endothermic mat materials are available, for example, under the trade designation "INTERAM MAT E-5" from 3M Co. St. Paul, Minn. These high temperature resistant materials are generally sufficiently flexible to conform to complex shapes and to conform to dimensional changes due to movement.

The packing material of the present disclosure can have resilient properties which permit the material to be pressure fit in the opening and around the penetrating object, if present. Typically, the packing material is installed in compression (e.g., 50% compression) to maximize fiber density and prevent loss of fit due to e.g., sagging or slipping.

In one embodiment, when filling the opening, the packing material is added such that it is in a compressed state. The packing material is used to enhance the sound reduction values. The depth of packing (i.e., the distance the packing material fills beginning from the first outer surface and extending into the wall cavity), and the type of material used can impact the efficiency of the reduction as is known in the art. The penetration can be packed with the packing material at its full depth (i.e., the entire length of the construction assembly between opposing walls such as in FIG. 2) for maximum sound rating (e.g., most reduction in sound transmission) or a fraction thereof, which may result in a higher sound (e.g., STC) rating.

The adhesive article of the present disclosure is a multilayer article comprising a substrate and an adhesive thereon. Other layers as known in the adhesive art may be present, such as a primer layer between the substrate and the adhesive and/or a coating (e.g., ink or low-adhesive backsizing) located on the second major surface of the substrate, opposite the adhesive layer, which is located on the first major surface of the substrate.

Adhesive materials useful in the present disclosure include those that allow adhesion to a variety of construction surfaces, including, for example, concrete, metal (e.g., aluminum or steel), and gypsum wallboard. Adhesive materials suitable for the practice of the present invention include silicones, acrylics, poly alpha olefins, ethylene/vinyl acetate, urethanes, and natural or synthetic rubbers. In one embodiment, the adhesive is a pressure sensitive adhesive.

Suitable urethane resins include polymers made from the reaction product of a compound containing at least two isocyanate groups (—N═C═O), referred to herein as "isocyanates", and a compound containing at least two active-hydrogen containing groups. Examples of active-hydrogen containing groups include primary alcohols, secondary alcohols, phenols, and water. A wide variety of isocyanate-terminated materials and appropriate co-reactants are well known, and many are commercially available for example, polyuerethane dispersion based PSA's from Dow Chemical Co. Also see, for example, Gunter Oertel, "Polyurethane Handbook", Hanser Publishers, Munich (1985)).

In one embodiment, active-hydrogen compounds containing primary and secondary amines can react with an isocyanate to form a urea linkage, thereby making a polyurea.

Suitable acrylic resins include acrylic pressure sensitive adhesives (PSAs). Acrylic PSAs comprise a (meth)acrylate ester monomer which is a monomeric (meth)acrylic ester of a non-tertiary alcohol, wherein the alcohol contains from 1 to 20 carbon atoms and preferably an average of from 4 to 14 carbon atoms.

Examples of monomers suitable for use as the (meth) acrylate ester monomer include the esters derived from either acrylic acid or methacrylic acid and non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctylalcohol, 2-ethyl-1-hexanol, 3,7-dimethylheptanol, 1-decanol, 1-dodecanol, 1-tridecanol, 1-tetradecanol, citronellol, dihydrocitronellol, and the like. In some embodiments, the preferred (meth)acrylate ester monomer is the ester of (meth)acrylic acid with butyl alcohol or isooctyl alcohol, or a combination thereof. In one embodiment, the (meth)acrylate ester monomer is present in an amount of 80 to 99 parts by weight based on 100 parts total monomer content used to prepare the polymer. Preferably (meth)acrylate ester monomer is present in an amount of 90 to 95 parts by weight based on 100 parts total monomer content.

The (meth)acrylic polymer further comprises a polar comonomer. For example, an acid group-containing comonomer. Examples of suitable acid-group containing monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl (meth)acrylate, 2-sulfoethyl (meth)acrylate, styrene sulfonic acid, 2-acrylamido-2-methylpropanesulfonic acid, vinylphosphonic acid, and mixtures thereof.

Due to their availability, acid functional monomers of the acid functional copolymer are generally selected from ethylenically unsaturated carboxylic acids, i.e. (meth)acrylic acids. When even stronger acids are desired, acidic monomers include the ethylenically unsaturated sulfonic acids and ethylenically unsaturated phosphonic acids. In one embodiment, the acid functional monomer is generally used in amounts of 0 to 10 parts by weight, preferably 1 to 5 parts by weight, based on 100 parts by weight total monomer.

Other polar monomers may also be polymerized with (meth)acrylate ester monomer to form the polymer. Representative examples of other suitable polar monomers include but are not limited to 2-hydroxyethyl (meth)acrylate; N-vinylpyrrolidone; N-vinylcaprolactam; acrylamide; mono- or di-N-alkyl substituted acrylamides, such as for example t-butyl acrylamide, dimethylaminoethyl acrylamide, and N-octyl acrylamide; poly(alkoxyalkyl) (meth)acrylates including 2-(2-ethoxyethoxy)ethyl (meth)acrylate, 2-ethoxyethyl (meth)acrylate, 2-methoxyethoxyethyl (meth)acrylate, 2-methoxyethyl methacrylate, polyethylene glycol mono(meth)acrylates and mixtures thereof. Exemplary polar monomers include those selected from the group consisting of 2-hydroxyethyl (meth)acrylate and N-vinylpyrrolidone. In one embodiment, the other polar monomer may be present in amounts of 0 to 10 parts by weight, preferably 1 to 5 parts by weight, based on 100 parts by weight total monomer.

When used, vinyl monomers useful in the (meth)acrylate polymer include: alkyl vinyl ethers (e.g., vinyl methyl ether); vinyl esters (e.g., vinyl acetate and vinyl propionate), styrene, substituted styrene (e.g., α-methyl styrene), vinyl halide, and mixtures thereof. Such vinyl monomers are generally used at 0 to 5 parts by weight, preferably 1 to 5 parts by weight, based on 100 parts by weight total monomer.

In order to increase cohesive strength of the coated adhesive composition, a multifunctional (meth)acrylate (comprising more than more acrylate group) may be incorporated into the blend of polymerizable monomers. Multifunctional acrylates are particularly useful for emulsion or syrup polymerization. Examples of useful multifunctional (meth)acrylate include, but are not limited to, di(meth)acrylates, tri(meth)acrylates, and tetra(meth)acrylates, such as 1,6-hexanediol di(meth)acrylate, poly(ethylene glycol) di(meth)acrylates, polybutadiene di(meth)acrylate, polyurethane di(meth)acrylates, and propoxylated glycerin tri(meth)acrylate, and mixtures thereof. The amount and identity of multifunctional (meth)acrylate is tailored depending upon application of the adhesive composition. Typically, the multifunctional (meth)acrylate is present in amounts less than 5 parts based on based on 100 parts by weight total monomer. In one embodiment, the multifunctional (meth)acrylate may be present in amounts from 0.01 parts to 1 part based on 100 parts total monomers of the adhesive composition.

Optional co-monomers can be used to tailor the performance of the PSA. Optional co-monomers include those having at least two different reactive groups e.g., 2-OH (meth) acrylate and glycidyl (meth)acrylate.

In one embodiment, the (meth)acrylic polymer can be crosslinked with thermal cross-linking agents, which are activated by heat, and/or photosensitive crosslinking agents, which are activated by ultraviolet (UV) light. Useful photosensitive cross-linking agents include: multifunctional (meth)acrylates, triazines, and combinations thereof. Exemplary crosslinking agents include substituted triazines such as 2,4,-bis(trichloromethyl)-6-(4-methoxy phenyl)-s-triazine, 2,4-bis(trichloromethyl)-6-(3,4-dimethoxyphenyl)-s-triazine, and the chromophore-substituted halo-s-triazines disclosed in U.S. Pat. Nos. 4,329,384 and 4,330,590 (Vesley). Various other crosslinking agents with different molecular weights between (meth)acrylate functionality may also be useful.

In one embodiment, glycidyl (meth)acrylate may be used as a thermal crosslinking agent to provide functionality which can be activated upon or after application in the field. For example, when the adhesive article is exposed to an elevated temperature, (e.g., a fire) the epoxy group of the glycidyl (meth)acrylate may react to provide further crosslinking, which can further increase the cohesive strength and increase the temperature resistance.

Suitable silicone resins include moisture-cured silicones, condensation-cured silicones, and addition-cured silicones, such as hydroxyl-terminated silicones, silicone rubber, and fluoro-silicone. Examples of suitable commercially available silicone PSA compositions comprising silicone resin include Dow Corning's 280A, 282, 7355, 7358, 7502, 7657, Q2-7406, Q2-7566 and Q2-7735; General Electric's PSA 590, PSA 600, PSA 595, PSA 610, PSA 518 (medium phenyl content), PSA 6574 (high phenyl content), and PSA 529, PSA 750-D1, PSA 825-D1, and PSA 800-C. An example of a two-part silicone resin is commercially available under the trade designation "SILASTIC J" from Dow Chemical Company, Midland, Mich.

Pressure sensitive adhesives (PSAs) can include natural or synthetic rubbers such as styrene block copolymers (styrene-butadiene; styrene-isoprene; styrene-ethylene/butylene block copolymers); nitrile rubbers, synthetic polyisoprene, ethylene-propylene rubber, ethylene-propylene-diene monomer rubber (EPDM), polybutadiene, polyisobutylene, butyl rubber, styrene-butadiene random copolymers, and combinations thereof.

Additional pressure sensitive adhesive include poly(alpha-olefins), polychloroprene, and silicone elastomers. In some embodiments, polychloroprene and silicone elastomers may be preferred since polychloroprene contains a halogen, which can contribute towards flame resistance, and silicone elastomers are resistant to thermal degradation.

In one embodiment, the pressure sensitive adhesives may also contain one or more conventional additives. Preferred additives include tackifiers, plasticizers, flame retardants, foaming agents, dyes, antioxidants, and UV stabilizers.

In some embodiment, a tackifing agent maybe required to provide the desired adhesive characteristics. Styrene block copolymers or (meth)acrylic polymers may include a suitable tackifying resin. Suitable tackifiers include rosin acids, rosin esters, terpene phenolic resins, hydrocarbon resins, and cumarone indene resins. The type and amount of tackifier can affect properties such as tack, bond strength, heat resistance, and specific adhesion. Exemplary tackifiers include: hydrogenated hydrocarbons available under the trade brands "REGALITE" and "REGALREZ", by Eastman Chemical Co., Middelburg, Netherlands; and "ARKON" by Arakawa Chemical Inc., Chicago, Ill.; glycerin rosin ester available under the trade designation "FORAL 85" from Eastman Chemical Co., Kingsport, Tenn.; hydrocarbon or rosin types are available under the series "ESCOREZ" from ExxonMobil Chemical, Houston, Tex.; hydrocarbon resins available under the series trade designation "WINGTACK" from Cray Valley, Exton, Pa.; and terpene phenolic tackifiers available under the trade designation "SYLVARES TP96" from Arizona Chemical, Jacksonville, Fla.

In one embodiment, the PSA may contain a plasticizer, which can help soften the adhesive, and as a result, the structural element is more easily wetted by the adhesive. Further, the use of a plasticizer may improve the adhesive properties, including peel. The plasticizer may be hydrophobic and/or hydrophilic.

In one embodiment, the pressure sensitive adhesive is selected from at least one of an acrylic copolymer and a tackified styrene block copolymer. For example, in one embodiment, the adhesive article must pass the tests for movement in as described in ASTM E1399/E1399M-97 (2013) "Standard Test Method for Cyclic Movement and Measuring the Minimum and Maximum Joint Widths of Architectural Joint Systems".

In one embodiment, the adhesive should have such properties that allow the adhesive article to move if the penetrant moves relative to the construction assembly.

In one embodiment, the adhesive has a 90° peel strength according to ASTM D6252/6252M-98 (2011) at a strain rate of 12 inches/minute of at least 0.4, 0.5, 0.7, 0.8, 1, 1.5, or even 2 lb/in on the structural element of the construction assembly such as gypsum wallboard and/or concrete. However, the acceptable peel strength can be dependent upon the overlap (or attachment area) of the adhesive article to the structural element. For example, with larger adhesive overlaps, lower peel strengths may be acceptable; whereas with smaller attachment overlaps, higher peel strengths may be necessary. In one embodiment, the adhesive articles of the present disclosure are not resealable, meaning that the adhesive articles cannot be sealed into place and then at some time point later, removed and reused to seal the penetration.

In one embodiment, the adhesive is disposed on at least one major surface of a substrate. In one embodiment, the adhesive is a continuous layer across the first major surface of the substrate, wherein the adhesive covers at least 20, 40, 50, 70, 80, 90, 99, or even 100% of one major surface of the substrate. The adhesive is applied at a thickness sufficient to adhere the adhesive article to a building's structural elements. The thickness of the adhesive typically ranges from about 2 mil (50 micrometers) to about 30 mil (762 micrometers). A thick layer of adhesive material may be desirable for some applications, for example so that the adhesive material conforms to an irregular surface of the structural element (e.g., concrete). Preferably, the adhesive forms a layer with sufficient adhesion between the adhesive article and the construction assembly. The time required for the adhesion to develop may vary due to humidity and/or ambient temperature.

The substrate of the adhesive article may be selected from a polymeric film, a paper, a nonwoven matrix, a woven matrix, a metallic sheet, a foam, and combinations thereof. Exemplary substrates include polyolefins such as polyethylene, polypropylene (including isotactic polypropylene), polystyrene, polyester (such as poly(ethylene terephthalate) and poly(butylene terephthalate), polyvinyl alcohol, poly (caprolactam), poly(vinylidene fluoride), polylactides, cellulose acetate, and ethyl cellulose and the like. Commercially available backing materials useful include Kraft paper (available from Monadnock Paper, Inc.); cellophane (available from Flexel Corp.); spun-bond poly(ethylene) and poly(propylene), available under the trade designation "TYVEK" and "TYPAR" (available from DuPont, Inc.); and porous films obtained from poly(ethylene) and poly(propylene), available under the trade designation "TESLIN" (available from PPG Industries, Inc.), and "CELLGUARD" (available from Hoechst-Celanese).

The substrate should be stable (i.e., does not auto-ignite or distort) at temperatures of at least 80° C., 85° C., 90° C., 93° C., 95° C., 98° C., 100° C., 150° C., 180° C., or even 200° C. In one embodiment, the substrate has some flexibility allowing the adhesive article to absorb some of the movement between the construction assembly and the penetrating object. In one embodiment, a polyolefin substrate is selected due to its resistance to humidity changes, as opposed to a paper backing, which may be preferred from a lifetime durability standpoint.

The adhesive article of the present disclosure is non-porous. The Gurley second or Gurley unit is a unit describing the number of seconds required for 100 cubic centimeters (1 deciliter) of air to pass through 1.0 square inch of a given material at a pressure differential of 4.88 inches of water. The lower the Gurely second, the more porous the material. In one embodiment, the adhesive article has a Gurely value of greater than 5, 10, 20, 40, or even 60 Gurley seconds. It is believed that the non-porosity of the adhesive article is important for sealing of the penetration, preventing air and gas passage. In one embodiment, the joint system comprising the smoke and sound barrier has a leakage rate of less than 1 CFM/linear foot as per UL 1479 (R2012), where CFM is cubic feet per min.

In one embodiment, the adhesive article can be used in a roll format, sheet, or a die cut shape. In one embodiment, the adhesive article comprises a liner, which is removed from the adhesive side of the adhesive article prior to application to the construction assembly.

In the present disclosure, the penetration is optionally filled with the packing material and the adhesive article is placed over the penetration, contacting the major surface of the construction assembly and the penetration object, if present, forming the smoke and sound barrier system. In one embodiment, the adhesive of the adhesive article contacts the optional packing material.

In one embodiment, the penetration is a blank, which does not comprise a penetrating object and the adhesive article is flush with the face of the major surface of the construction assembly, as shown in FIG. 1B.

In another embodiment, a penetrating object extends beyond the surface of the construction assembly comprising the penetration as shown in FIG. 2. In this embodiment, one portion of the adhesive article is fixedly attached to the major surface of the construction assembly, while another portion of the adhesive article is fixedly attached to the penetrating object. The adhesive article should sufficiently overlap the major surface of the construction assembly and the penetrating object, if present, to maintain contact and maintain a seal over the lifetime of the system. In other words, the adhesive article sufficiently covers the penetration or the space between the opening and the penetrating object, to seal the penetration, preventing the spread of smoke and/or gases. In one embodiment, the adhesive article overlaps the opening by at least 0.25, 0.5, 0.75, 1, 2, or even 4 inches (6.4, 12.7, 19, 25.4, 50.8, or even 101.6 mm) around the perimeter of the opening; and at most 6 or even 12 inches (152.4, or even 304.8 mm). In other words, the adhesive article contacts the first attachment area by at least 0.25 inches. The acceptable overlap of the adhesive article with the attachment area can depend on the nature of the structural element (e.g., concrete versus gypsum) of the construction assembly; adhesive used (e.g., the 90 degree peel strength as mentioned above); and/or the flexibility of the substrate (e.g., more overlap needed for substrates that are not as flexible).

Heretofore the means for sealing such penetrations has been to insert an insulation batting or to spray foam, putty, or caulk into the gap. Using an adhesive article as disclosed herein for a smoke and sound barrier has advantages over the putties, caulk and spray coating, including the ability to use over a broader working range (for example, at temperatures below 4° C. and in wet conditions) with little preparation of the structural elements, and ease of use (i.e., rolling a strip of tape down a wall wherein the adhesive is contained up the adhesive substrate).

Typically the smoke and sound barrier of the present disclosure is applied to both sides of the construction assembly to provide maximum results. Although not wanting to be limited by theory, it is believed that the presence of the packing material aides in reducing sound transmission, helping to restore the construction assembly more closely back to its original rating. Although not wanting to be limited by theory, it is believed that the adhesive article acts as a non-porous barrier, minimizing a stack effect (i.e., movement of air resulting from pressure, temperature, and/or moisture differences). These stack effects can lead to potential spreading of smoke from one area to another throughout the building.

It has been discovered that optionally packing the opening with a packing material and sealing with a non-porous adhesive article, such as a tape, provides a smoke and sound barrier. The smoke and sound barrier must also have the ability to flex with building movement and have long term durability (e.g., 20 years, 30 years or even 40 years). Furthermore, construction sites are typically thought of as dirty, with dust, dirt, etc. In one embodiment, the adhesive articles disclosed herein can be applied to the first and second structural elements without clean-up or priming of the structural elements. Still further, in one embodiment, the adhesive articles disclosed herein can be applied to water saturated structural elements such as cement concrete and still fixedly attach to the structural element.

Exemplary embodiments which are useful for understanding the present disclosure include the following.

Embodiment 1

Use of a non-porous adhesive article, and optionally a packing material, on a construction assembly to provide a smoke and sound barrier system, wherein the non-porous adhesive article comprises a substrate and an adhesive disposed on a first major surface of the substrate;

wherein the construction assembly comprises a first major surface and an opposing second major surface and further comprises a first penetration which intersects the first major surface, the first major surface further comprises a first attachment area located about the perimeter of the penetration;

wherein the first penetration optionally comprises the packing material; and wherein the non-porous adhesive article is fixedly attached to the first attachment area.

Embodiment 2

The use as in embodiment 1, further comprising a penetrating object having a second attachment area, wherein the penetrating object passes through the first penetration and extends beyond the first major surface of the construction assembly, wherein the non-porous adhesive article is fixedly attached to the first attachment area and the second attachment area.

Embodiment 3

The use as in any one of the previous embodiments, wherein the second major surface comprises a second penetration which intersects the second major surface of the construction assembly, the second major surface further comprises a third attachment area located about the perimeter of the second penetration; wherein the second penetration optionally comprises the packing material; and wherein the non-porous adhesive article is fixedly attached to the third attachment area.

Embodiment 4

The use as in embodiment 3, further comprising a penetrating object having a fourth attachment area, wherein the penetrating object passes through the second penetration and extends beyond the second major surface of the construction assembly, wherein the non-porous adhesive article is fixedly attached to the third attachment area and the fourth attachment area.

Embodiment 5

The use as in any one of embodiments 2-4, wherein the penetrating object is selected from at least one of a conduit, a pipe, a cable, a tray, and a duct.

Embodiment 6

The use as in any one of embodiments 2-5, wherein the penetrating object comprises at least one of metal, glass, fiberglass, and plastic.

Embodiment 7

The use as in any one of the previous embodiments, wherein the non-porous adhesive article comprises an adhesive selected from at least one of an epoxy, an acrylic, a urethane, a silicone, and a rubber.

Embodiment 8

The use as in of any one of the previous embodiments, wherein the adhesive is a pressure sensitive adhesive.

Embodiment 9

The use as in of any one of the previous embodiments, wherein the adhesive comprises at least one of (i) an acrylic adhesive and (ii) a styrene block copolymer and a tackifier.

Embodiment 10

The use as in any one of the previous embodiments, wherein the substrate is selected from at least one of a polymeric film, a paper, a nonwoven matrix, a woven matrix, a metallic sheet, and a foam.

Embodiment 11

The use as in any one of the previous embodiments, wherein the packing material is selected from at least one of mineral wool, ceramic fiber, glass fiber, and foam.

Embodiment 12

The use as in any one of the previous embodiments, wherein the penetration has a smallest dimension of at least 3.2 mm.

Embodiment 13

The use as in any one of the previous embodiments, wherein the construction assembly comprises at least one of cement, gypsum, wood, metal, and plastic.

Embodiment 14

A smoke and sound barrier system comprising
a non-porous adhesive article comprising a substrate and an adhesive disposed on a first major surface of the substrate;
(a) optionally a packing material; and
(b) a construction assembly comprising a first major surface and an opposing second major surface and a first penetration which intersects the first major surface, the first major surface comprising a first attachment area located about the perimeter of the penetration;
wherein the first penetration optionally comprises the packing material; and wherein the non-porous adhesive article is fixedly attached to the first attachment area.

Embodiment 15

The smoke and sound barrier system of embodiment 14, further comprising a penetrating object having a second attachment area, wherein the penetrating object passes through the first penetration and extends beyond the first major surface of the construction assembly, wherein the non-porous adhesive article is fixedly attached to the first attachment area and the second attachment area.

Embodiment 16

The smoke and sound barrier system of any one of embodiments 14-15, wherein the second major surface comprises a second penetration which intersects the second major surface of the construction assembly, the second major surface further comprises a third attachment area located about the perimeter of the second penetration; wherein the second penetration optionally comprises the packing material; and wherein the non-porous adhesive article is fixedly attached to the third attachment area.

Embodiment 17

The smoke and sound barrier system of embodiment 16, further comprising a penetrating object having a fourth attachment area, wherein the penetrating object passes through the second penetration and extends beyond the second major surface of the construction assembly, wherein the non-porous adhesive article is fixedly attached to the third attachment area and the fourth attachment area.

Embodiment 18

The smoke and sound barrier system of any one of embodiments 15-17, wherein the penetrating object is selected from at least one of a conduit, a pipe, a cable, a tray, and a duct.

Embodiment 19

The smoke and sound barrier system of any one of embodiments 15-18, wherein the penetrating object comprises at least one of metal, glass, fiberglass, and plastic.

Embodiment 20

The smoke and sound barrier system of any one of embodiments 14-19, wherein the non-porous adhesive article comprises an adhesive selected from at least one of an epoxy, an acrylic, a urethane, a silicone, and a rubber.

Embodiment 21

The smoke and sound barrier system of any one of embodiments 14-20, wherein the adhesive is a pressure sensitive adhesive.

Embodiment 22

The smoke and sound barrier system of any one of embodiments 14-21, wherein the adhesive comprises at least one of (i) an acrylic adhesive and (ii) a styrene block copolymer and a tackifier.

Embodiment 23

The smoke and sound barrier system of any one of embodiments 14-22, wherein the substrate is selected from at least one of a polymeric film, a paper, a nonwoven matrix, a woven matrix, a metallic sheet, and a foam.

Embodiment 24

The smoke and sound barrier system of any one of embodiments 14-23, wherein the packing material is selected from at least one of mineral wool, ceramic fiber, glass fiber, and foam.

Embodiment 25

The smoke and sound barrier system of any one of embodiments 14-24, wherein the penetration has a smallest dimension of at least 3.2 mm.

Embodiment 26

The smoke and sound barrier system of any one of embodiments 14-25, wherein the construction assembly comprises at least one of cement, gypsum, wood, metal, and plastic.

Embodiment 27

The smoke and sound barrier system of any one of embodiments 14-26, wherein the construction assembly of embodiment 1 free of the penetration has an original STC rating; wherein the smoke and sound barrier joint system of any one of embodiments 14-26 has a second STC rating; and wherein the second STC rating is at least 50% of the original rating.

Embodiment 28

The smoke and sound barrier system of any one of embodiments 14-27, wherein the smoke and sound barrier joint system has an air leakage rating of less than 1 CFM/linear foot.

Embodiment 29

The smoke and sound barrier system of any one of embodiments 14-28, wherein the non-porous adhesive article can withstand differential movement between the penetrating object and the construction assembly.

Embodiment 30

A method of making a smoke and sound barrier system comprising
(a) providing a construction assembly comprising a first major surface and an opposing second major surface and further comprising a first penetration which intersects the first major surface, the first major surface further comprises a first attachment area located about the perimeter of the penetration,
(b) optionally inserting a packing material into the first penetration; and then
(c) sealing the first penetration by fixedly attaching a non-porous adhesive article to the first attachment area of the first major surface to form a smoke and sound barrier system.

Embodiment 31

The method of embodiment 30, wherein the construction assembly further comprises a penetrating object having a second attachment area, wherein the penetrating object passes through the first penetration and extends beyond the first major surface of the construction assembly, and sealing the first penetration by fixedly attaching the non-porous adhesive article to the first attachment area and the second attachment area.

Embodiment 32

The method of any one of embodiments 30-31, wherein the second major surface of the construction assembly comprises a second penetration which intersects the second major surface of the construction assembly, the second major surface further comprises a third attachment area located about the perimeter of the second penetration; optionally, inserting the packing material into the second penetration; and sealing the second penetration by fixedly attaching a non-porous adhesive article to the third attachment area of the second major surface to form a smoke and sound barrier system.

Embodiment 33

The method of embodiment 32, wherein the construction assembly further comprises a penetrating object having a fourth attachment area, wherein the penetrating object passes through the second penetration and extends beyond the second major surface of the construction assembly, and sealing the second penetration by fixedly attaching the non-porous adhesive article to the third attachment area and the fourth attachment area.

EXAMPLES

All materials are commercially available or known to those skilled in the art unless otherwise stated or apparent.

The following abbreviations are used: cm=centimeter; in =inch; lbs=pounds; mm=millimeter; m=meter; and ft=foot.

| Materials Table | |
|---|---|
| Material | Description |
| Tape 4016 | A tape available under the trade designation "3M DOUBLE COATED URETHANE FOAM TALE 4016" 1/16 inch (1.6 mm) thick |
| Tape 4466 | A tape available under the trade designation "3M DOUBLE COATED POLYETHYLENE FOAM TAPE 4466" 1/16 inch (1.6 mm) thick |
| Tape 4516 | A tape available under the trade designation "3M VINYL FOAM TAPE 4516" 1/16 inch (1.6 mm) thick |
| Tape 8067 | An acrylic pressure sensitive adhesive tape available under the trade designation "3M ALL-WEATHER FLASHING TAPE 8067" from 3M Co., with a tape thickness of (0.0099 in) 0.25 mm with a backing thickness of (0.005 in) 0.13 mm. |
| Tape 5490 | A polytetrafluoroethylene tape available under the trade designation "3M PTFE FILM TAPE 5490" from 3M Co. |

Test Methods

Sound Testing

Samples were tested according to ASTM E90-04 "Standard Test Method for Laboratory Measurement of Airborne Sound Transmission Loss of Building Partitions and Elements" and ASTM E413 "Classification for Rating Sound Insulation". The wall consisted of a sealed slotted wall panel 1.21 m (47.50 in.) wide by 2.43 m (95.50 in.) high and 254.0 mm (10.0 in.) thick. The wall comprised three voids that were nominally 12.7 mm (0.50 in.) wide, which extended through the wall. The finished wall assembly was tested in a 1.22 m (4.0 ft.) by 2.44 m (8.0 ft.) test opening and was sealed on the periphery (both sides) with dense mastic. The source room temperature at the time of the test was 21±0° C. (70±0° F.) and 52±1% relative humidity. The receiving room temperature at the time of the test was 21±0° C. (70±0° F.) and 50±1% relative humidity. The source and receive reverberation room volumes were 178 m$^3$ (6,298 ft$^3$) and 139 m$^3$ (4,924 ft$^3$), respectively. The transmission area used in the calculations was 2.9 m$^2$ (31.5 ft$^2$).

Leakage Testing

Leakage Testing was conducted according to UL 1479 (R2012), wherein the assembly is exposed to elevated temperatures (e.g., a controlled fire). According to UL 1479, the installation must show no tears or loss of adhesion (in other words, maintain integrity) to the construction assembly in order to pass. If any tears or loss of adhesion to the structural elements are noted, this section of the testing fails.

Peel Adhesion Test

The 90 degree peel adhesion test was performed similarly to ASTM D6252/6252M-98 (2011) "Standard Test Method for Peel Adhesion of Pressure-Sensitive Label Stocks at a 90° Angle". The adhesive articles were cut into 1 in (2.54 cm) wide strips. Testing differed from the ASTM D6252/6252M in that the testing surface (i.e., the gypsum wallboard) was wiped clean with only a cloth, and the strips of tape were adhered by hand strength to the stated construction assembly material with a rubber roller. Less than a 60 sec dwell time was allowed, and the sample was measured for 90 degree peel adhesion at a speed of 12 in/min. Results are reported in lbs/in.

Sound Testing Example

A wall was built to have an STC rating of 54. The testing wall comprised a Side A and a Side B with 3 voids therethrough. Each of the voids was treated identically per sample and the wall was then tested by the Sound Test Method above for its STC rating. In sample 1, neither side of the voids were treated. In samples 3, 5, 7, 9 and 11, only one side of the voids was treated with an adhesive article, liner removed if present, as shown in Table 1. In samples 2, 4, 6, 8, 10, and 12 both sides of the voids were treated with an adhesive article, liner removed if present, as shown in Table 1. In samples 3-6, a packing material was used to fill the 0.5 inch voids. In samples 3-4, a 0.5 in (12.7 mm) wide and 0.5 inch (12.7 mm) in length piece of backer rod (cut from model 71480 0.5 in by 20 feet long caulk backer rod from MD Building Products, Oklahoma City, Okla.) was used to fill the voids. In samples 5-6, 0.75 in (19 mm) wide and 2 in (51 mm) length piece of mineral wool (Roxul Inc. Ontario, Canada) was compressed and placed into the voids, having a 2 in depth. The results are shown in Table 1

TABLE 1

| Sample | Side A | Side B | Packing Material | STC Rating |
|---|---|---|---|---|
| 1 | none | none | none | 20 |
| 2 | Tape 8067 | Tape 8067 | none | 43 |
| 3 | Tape 8067 | none | Backer rod | 40 |
| 4 | Tape 8067 | Tape 8067 | Backer rod | 54 |
| 5 | Tape 8067 | none | mineral wool | 53 |
| 6 | Tape 8067 | Tape 8067 | mineral wool | 54 |
| 7 | Tape 4016 | none | none | 33 |
| 8 | Tape 4016 | Tape 4016 | none | 47 |
| 9 | Tape 4466 | none | none | 31 |
| 10 | Tape 4466 | Tape 4466 | none | 41 |
| 11 | Tape 4516 | none | none | 37 |
| 12 | Tape 4516 | Tape 4516 | none | 52 |

Leakage Testing Example

Two gypsum walls were constructed in the manner described in the individual U400-Series Wall or Partition Design in the UL Fire Resistance Directory (2014) and included the following construction features: Wall framing consisted of steel channel studs. Steel studs were a minimum 3⅝ in. (92 mm) wide by 1¼ in. (32 mm) deep with a minimum 25 gauge steel channels. Steel stud spacing was a maximum of 24 in. (610 mm) on center. Two layers ⅝ in. (16 mm) thick gypsum wallboard, as specified in the individual U400-Series Design were used on each side of the wall.

A wall assembly was constructed with two gypsum walls (16 in (406 mm) by 35 in (889 mm)) having a 2 inch (51 mm) width by 35 in (889 mm) linear opening therebetween. The two walls were aligned next to one another with the stated linear joint opening and the assembly was placed into an external metal frame and secured during testing.

An adhesive article was placed over both sides of the joint (fire side and the "cold" side). The adhesive article was placed over the opening, overlapping the gypsum wallboard by a minimum of 2.54 cm (1 in.) on each side of the joint. The adhesive article covered the length of the joint as well. UL 1479 calls out a specific temperature profile for this leakage test with a maximum temperature of 400° F. For this testing, the temperature profile was maintained between 400 and 500° F. for 30 minutes as the furnace used was incapable of maintain a temperature below 400° F. The joint system was tested per the Leakage Testing and the results are shown in Table 3.

A Peel Adhesion Test as described above was performed on Tape 8067 and Tape 5490 on a piece of gypsum wallboard. The results are shown in Table 3 as well.

TABLE 3

| Adhesive Article | Leakage Test | Peel adhesion (lbs/in) |
|---|---|---|
| Tape 8067 | Pass | >2 |
| Tape 5490 | Fail | 0.3 |

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. Use of a non-porous adhesive article, and optionally a packing material, on a construction assembly to provide a smoke and sound barrier system,
   wherein the non-porous adhesive article comprises a substrate and an adhesive disposed on a first major surface of the substrate;
   wherein the construction assembly comprises a first major surface and an opposing second major surface and further comprises a first penetration which intersects the first major surface, the first major surface further comprises a first attachment area located about the perimeter of the penetration;
   wherein the first penetration optionally comprises the packing material; and
   wherein the non-porous adhesive article is fixedly attached to the first attachment area, wherein the non-porous adhesive article has a 90° peel strength of at least 0.7 lb/in when tested according to Peel Adhesion Test at a strain rate of 12 inches/minute on a gypsum wallboard.

2. The use as in claim 1, further comprising a penetrating object having a second attachment area, wherein the penetrating object passes through the first penetration and extends beyond the first major surface of the construction assembly, wherein the non-porous adhesive article is fixedly attached to the first attachment area and the second attachment area.

3. The use as in claim 1, wherein the second major surface comprises a second penetration which intersects the second major surface of the construction assembly, the second major surface further comprises a third attachment area located about the perimeter of the second penetration; wherein the second penetration optionally comprises the packing material;

and wherein the non-porous adhesive article is fixedly attached to the third attachment area.

4. The use as in claim 3, further comprising a penetrating object having a fourth attachment area, wherein the penetrating object passes through the second penetration and extends beyond the second major surface of the construction assembly, wherein the non-porous adhesive article is fixedly attached to the third attachment area and the fourth attachment area.

5. The use as in claim 1, wherein the non-porous adhesive article comprises an adhesive selected from at least one of an epoxy, an acrylic, a urethane, a silicone, and a rubber.

6. The use as in claim 1, wherein the adhesive is a pressure sensitive adhesive.

7. The use as in claim 1, wherein the adhesive comprises at least one of (i) an acrylic adhesive and (ii) a styrene block copolymer and a tackifier.

8. The use as in claim 1, wherein the packing material is selected from at least one of mineral wool, ceramic fiber, glass fiber, and foam.

9. A smoke and sound barrier system comprising
(a) a non-porous adhesive article comprising a substrate and an adhesive disposed on a first major surface of the substrate;
(b) optionally a packing material; and
(c) a construction assembly comprising a first major surface and an opposing second major surface and a first penetration which intersects the first major surface, the first major surface comprising a first attachment area located about the perimeter of the penetration;
wherein the first penetration optionally comprises the packing material; and wherein the non-porous adhesive article is fixedly attached to the first attachment area, wherein the non-porous adhesive article has a 90° peel strength of at least 0.7 lb/in when tested according to Peel Adhesion Test at a strain rate of 12 inches/minute on a gypsum wallboard.

10. A method of making a smoke and sound barrier system comprising
(a) providing a construction assembly comprising a first major surface and an opposing second major surface and further comprising a first penetration which intersects the first major surface, the first major surface further comprises a first attachment area located about the perimeter of the penetration,
(b) optionally inserting a packing material into the first penetration; and then
(c) sealing the first penetration by fixedly attaching a non-porous adhesive article to the first attachment area of the first major surface to form a smoke and sound barrier system, wherein the non-porous adhesive article has a 90° peel strength of at least 0.7 lb/in when tested according to Peel Adhesion Test at a strain rate of 12 inches/minute on a gypsum wallboard.

11. The use as in claim 1, wherein the non-porous adhesive article is a roll good.

12. The use as in claim 1, wherein the substrate is selected from at least one of a polymeric film, a paper, a nonwoven matrix, a woven matrix, and a foam.

13. The smoke and sound barrier system of claim 9, further comprising a penetrating object having a second attachment area, wherein the penetrating object passes through the first penetration and extends beyond the first major surface of the construction assembly, wherein the non-porous adhesive article is fixedly attached to the first attachment area and the second attachment area.

14. The smoke and sound barrier system of claim 9, wherein the non-porous adhesive article comprises an adhesive selected from at least one of an epoxy, an acrylic, a urethane, a silicone, and a rubber.

15. The smoke and sound barrier system of claim 9, wherein the penetration is a blank.

16. The smoke and sound barrier system of claim 9, wherein the adhesive comprises at least one of (i) an acrylic adhesive and (ii) a styrene block copolymer and a tackifier.

17. The smoke and sound barrier system of claim 9, wherein the substrate is selected from at least one of a polymeric film, a paper, a nonwoven matrix, a woven matrix, a metallic sheet, and a foam.

18. The method of claim 10, wherein the construction assembly further comprises a penetrating object having a second attachment area, wherein the penetrating object passes through the first penetration and extends beyond the first major surface of the construction assembly, and sealing the first penetration by fixedly attaching the non-porous adhesive article to the first attachment area and the second attachment area.

19. The smoke and sound barrier system of claim 9, wherein the non-porous adhesive article has a Gurley value of greater than 10 Gurley seconds.

20. Use of a non-porous adhesive article according to claim 1, wherein the non-porous adhesive article has a Gurley value of greater than 10 Gurley seconds.

* * * * *